US012703255B2

(12) United States Patent
Wetterich et al.

(10) Patent No.: US 12,703,255 B2
(45) Date of Patent: Aug. 11, 2026

(54) PROTECTIVE CAP FOR INLET RECEPTACLE OF ELECTRICAL CHARGING SYSTEM

(71) Applicant: Caterpillar Inc., Peoria, IL (US)

(72) Inventors: Joshua D. Wetterich, Dunlap, IL (US); Basheer B. Qattum, Peoria, IL (US); Jeffery M. Othman, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 386 days.

(21) Appl. No.: 18/492,756

(22) Filed: Oct. 23, 2023

(65) Prior Publication Data

US 2025/0128616 A1 Apr. 24, 2025

(51) Int. Cl.
*H01R 13/52* (2006.01)
*B60L 53/16* (2019.01)

(52) U.S. Cl.
CPC .......... *B60L 53/16* (2019.02); *H01R 13/5213* (2013.01)

(58) Field of Classification Search
CPC .. B60L 53/16; H01R 13/5213; H01R 2201/26
See application file for complete search history.

(56) References Cited

U.S. PATENT DOCUMENTS 5,545,046 A * 8/1996 Masuda .................. B60L 53/31 439/142
9,132,732 B2 * 9/2015 Yamashita ......... H01R 13/5213
2013/0143432 A1 * 6/2013 Yamashita ............. B62K 11/10 439/503
2013/0183874 A1 * 7/2013 Cawood ................... H01R 4/70 439/892
2014/0187095 A1 * 7/2014 Liu ........................ H01R 24/20 439/638
2016/0172781 A1 * 6/2016 Nunner .................... H01R 4/38 439/660
2020/0282851 A1 * 9/2020 Sasaridis ................. B60L 53/18
2021/0050127 A1 * 2/2021 Lee ....................... B60L 53/302
2023/0085351 A1 * 3/2023 Mathews ................ B60L 53/16 439/76.2
2023/0231340 A1 * 7/2023 Kobayashi ......... H01R 13/5833 439/445

(Continued)

FOREIGN PATENT DOCUMENTS

CN 206532952 U 9/2017
CN 207967441 U 10/2018

(Continued)

OTHER PUBLICATIONS

Written Opinion and International Search Report for Int'l. Patent Appln. No. PCT/US2024/048141, mailed Nov. 28, 2024 (16 pgs).

*Primary Examiner* — Truc T Nguyen

(57) ABSTRACT

A protective cap can be mated with an inlet receptacle of an electrical charging system on a mining machine. The protective cap is made of a non-conductive rigid material and can include a triangular shell extending from a planar cap plate. Extending from the cap plate opposite the triangular shell can be a cap handle including a flange and a standoff web to form one or more undercuts between the flange and cap plate. In an aspect, the cap handle is configured to be grasped by a mechanical gripper.

19 Claims, 5 Drawing Sheets

(56) References Cited

U.S. PATENT DOCUMENTS

2025/0369520 A1* 12/2025 Evans ...................... F16K 1/04

FOREIGN PATENT DOCUMENTS

| | | | | | |
|---|---|---|---|---|---|
| CN | 209616908 | U | | 11/2019 | |
| CN | 209757293 | U | | 12/2019 | |
| CN | 210535874 | U | | 5/2020 | |
| CN | 212342896 | U | | 1/2021 | |
| CN | 213261990 | U | | 5/2021 | |
| CN | 215579255 | U | | 1/2022 | |
| CN | 114655046 | A | | 6/2022 | |
| CN | 218316275 | U | | 1/2023 | |
| DE | 102019122475 | A1 | | 2/2021 | |
| KR | 102183176 | B1 | | 11/2020 | |
| KR | 20210082767 | | * | 7/2021 | ............ H01R 13/62 |

* cited by examiner

PROTECTIVE CAP FOR INLET RECEPTACLE OF ELECTRICAL CHARGING SYSTEM

TECHNICAL FIELD

This patent disclosure relates generally to a protective cap for an inlet receptacle of an electrical charging system and, more particularly, to a protective cap that may be adapted for automated mating with a complementary inlet receptacle.

BACKGROUND

Large scale mobile machines used in industries like mining, construction, or agriculture, are equipped with large power plants to deliver motive power on the order of several megawatts suitable for the large loads encountered during operation. While traditionally large mobile machines operating in such industries used internal combustion engines to generate the required power, more recently some machines have been configured to operate on electrical power. An electrically powered large mobile machine can include an electric motor that converts electricity to a motive force to operate the mechanical implements of the machine. To provide a source of electrical power, the electrical motor is operatively associated with one or more rechargeable batteries that accumulate and store electrical energy and are disposed on the mobile machine.

The rechargeable batteries may become depleted during operation and may require periodic recharging from another source of electrical power such as the electric grid. To recharge the rechargeable batteries, the large mobile machine can be operatively associated with an electrical charging system that includes an electrical connector to operatively couple the mobile machine to the power source. The electrical connector may include an inlet receptacle, typically disposed on the mobile machine, and a charging plug that can be detachably mated with the inlet receptacle. The charging plug may be operatively associated with a charging station capable of delivering several megawatts of electricity to the electrical charging system. The present disclosure is directed to device for protecting the inlet receptacle from contamination by debris and moisture when not plugged into the charging station and charging.

SUMMARY

The disclosure describes, in one aspect, a protective cap configured for detachably mating to inlet receptacle of an electrical charging system. The protective cap includes a planar cap plate, a triangular shell joined to and extending from the cap plate in a first direction, and a cap handle joined to and extending from the cap plate in a second direction opposite the triangular shell. The triangular shell can define and enclose a pin boss cavity to receive a pin boss of the inlet receptacle when mated thereto. The cap plate, triangular shell, and cap handle can be made of a rigid polymer and can be integrally joined together.

In another aspect, the disclosure describes an electrical connector for an electrical charging system including an inlet receptacle and a protective cap that can be mated together with respect to an insertion axis. The inlet receptacle includes a triangular pin boss disposed within a receptacle recess that has a plurality of pin sockets. The triangular pin boss is circumscribed by a triangular boundary wall of the inlet receptacle and is separated therefrom by a receptacle channel. The protective cap is detachably mateable to the inlet receptacle and includes a cap plate oriented normal to the insertion axis when mated to the inlet receptacle. Extending perpendicularly from the cap plate in a first direction is a triangular shell integrally joined to the cap plate. The triangular shell may have a peripheral wall having a first planar panel, a second planar panel, and a third planar panel triangularly arranged with respect to each other and configured for a sliding fit with the receptacle channel of the inlet receptacle. To grasp and mate or detach the protective gap with the inlet receptacle, the protective cap can include a cap handle integrally joined to and protruding from the cap plate in a second direction opposite the first direction.

DETAILED DESCRIPTION

Figure 1:
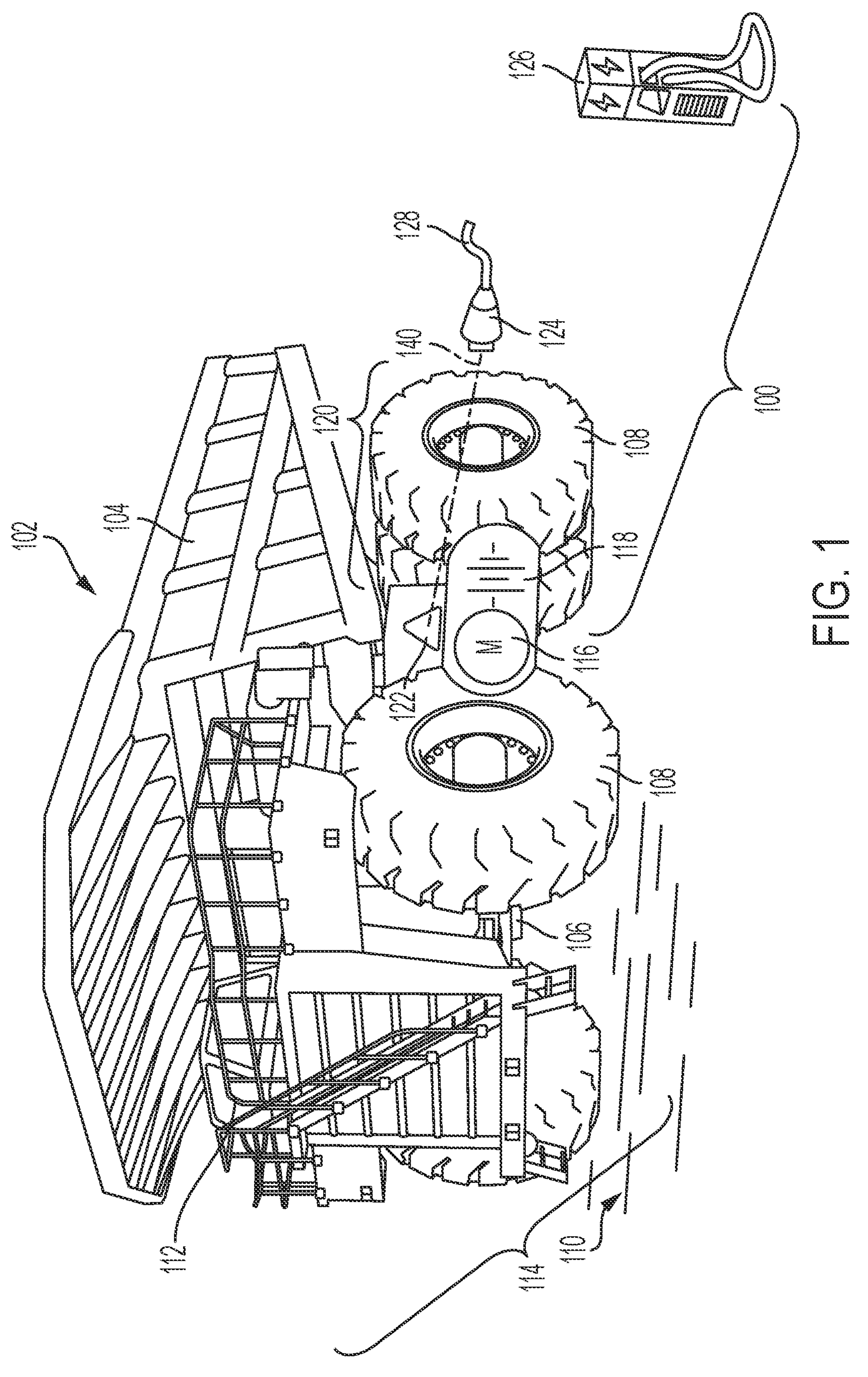
FIG. 1 is a perspective view of a mobile mining haul machine configured for electrically powered operation with one or more rechargeable electric batteries connectable with electrical charging system.

Now referring to the drawings, wherein whenever possible like reference numbers will refer to like elements, there is illustrated in FIG. 1 an electrical charging system 100 for a large mobile mining haul machine 102. Such mining haul machines 102, which may also be referred to as mining dump trucks, are used to transport mined or excavated materials including mineral ores and earthen soil about a worksite during a mining operation and the material payload of the mining haul machine 102 may be on the order of several tons. To accommodate the mined material, the mining haul machine 102 can include a dump body 104 that is pivotally attached and can articulate with respect to a machine frame 106. The dump body 104 can be pivotally tilted with respect to the machine frame 106 to dump the payload where desired. To enable the mobile mining haul machine 102 to travel about the mining site, the machine frame 106 can be supported on a plurality of rotatable wheels 108 or similar propulsion devices like continuous tracks that contact and exert a tractive force against the work surface 110 of the mining site. However, while the electrical charging system 100 is disclosed herein with respect to a mobile mining haul machine 102, aspects of the disclosure will be applicable to other large electrically powered machines that require electrical charging systems capable of delivering charges on the order of several megawatts.

To accommodate an operator, the mining haul machine 102 can include an onboard operator station 112 disposed on the machine frame 106 at a location that provides visibility about the mining site. Because of the large size of the mining haul machine 102, the onboard operator station 112 may be located several meters above the work surface 110 and is accessible via a ladder and catwalk arrangement 114. In possible embodiments, the mining haul machine 102 can be configured for remote operation, wherein the machine is operated remotely by an off-board operator, or for autonomous operation in which the machine operates without significant human input.

In accordance with the disclosure, the mining haul machine 102 can be configured for electrically power operation in which an electric motor 116 delivers motive power to the rotatable wheels 108 to propel movement the machine. To provide electrical power to the electric motor 116, the mining haul machine 102 can include one or more rechargeable electrical batteries 118 located onboard the machine frame 106. The electrical batteries 118 store and provide a fixed amount of electrical energy for the electrical motor 116 but, during operation, may become depleted and require periodic recharging from a superior power source such as the power grid. The electrical charging system 100 is included on the mining haul machine 102 to operatively interface with the power grid and deliver recharging electricity to the electrical batteries 118.

The electrical charging system 100 can be designed to deliver an electrical charge of several megawatts as may be necessary to electrically power the large mobile mining machine 102 that, due to its physical size and payload weight, may require significant amounts of electrical power during operation. An example of a suitable electrical charging system for megawatt charging is the system proposed under SAE standard J3271, also referred to as the Megawatt Charging System ("MCS"), although aspects of the disclosure may however be applicable to other electrical charging systems. To connectively interface with the mining haul machine 102, the electrical charging system 100 can include an electrical connector 120 that may be a multiple component arrangement including an inlet receptacle 122 disposed onboard the machine frame 106 that can mate with a charging plug 124 electrically connected to a charging station 126 via an flexible power cable 128.

Figure 2:
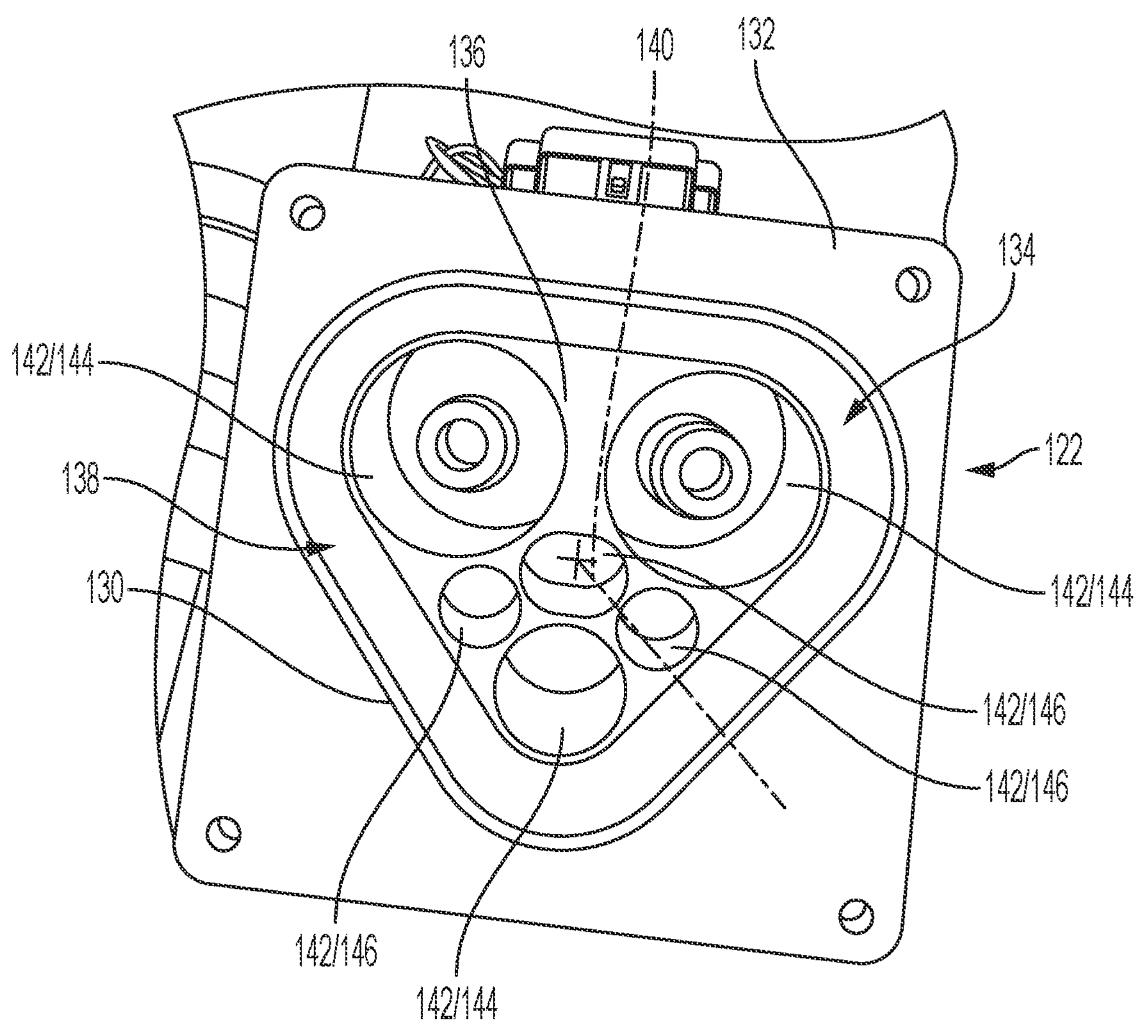
FIG. 2 is a front plane view of an inlet receptacle on the mobile mining haul machine that is part of an electrical connection associated with an electrical charging system.

Referring to FIG. 2, the inlet receptacle 122 can function as the female component of the electrical connection 120 and may have a geometric arrangement to facilitate mating with the male configuration of the charging plug. In the embodiment of an MCS J3271 electrical charging system, the geometric arrangement of the inlet receptacle 122 can be embodied as a generally triangular profile to facilitate alignment when mating with the charging plug.

For example, the inlet receptacle 122 can include a triangular boundary wall 130 that projects outwardly from and perpendicular to a planar receptacle baseplate 132. The receptacle baseplate 132 can be square in shape with an outer periphery that is dimensionally larger than the three sided triangular boundary wall 130. The triangular boundary wall 130 can be of thin-wall construction and can define an inwardly-located hollow receptacle recess 134 that geometrically conforms to the shape of the triangular boundary wall 130. Disposed within the receptacle recess 134 is a triangular pin boss 136 that can be separated from triangular boundary wall 130 by a gap or receptacle channel 138. The receptacle channel 138 is spatially located between and conforms in geometric shape to the triangular boundary wall 130 and the triangular pin boss 136 such that the boundary wall 130 circumscribes the receptacle channel 138 that circumscribes the pin boss 136.

In an embodiment, the triangular geometric profile of the inlet receptacle 122 may be an equilateral triangle with the three vertices having the same angle. Moreover, the triangular boundary wall 130, the receptacle channel 138, and the triangular pin boss 136 can circumscribe and can be equidistantly located about an insertion axis 140 (indicted by the encircled cross) that extends perpendicular to the baseplate 132 of the inlet receptacle 122. The insertion axis 140 can corresponding in spatial location with the centroid of the triangular profile of the inlet receptacle 122. The outer triangular boundary wall 130 and the inner triangular pin boss 136 can generally extend coextensively the same dimensional distance from the planar baseplate 132 and terminate at their forward faces flush with each other.

To establish electrical communication with the charging station, the triangular pin boss 136 can include a plurality of pin sockets 142 disposed within the forward face of the pin boss. By way of example, the pin socket 142 may include larger circular power sockets 144 that are located at each of the vertices of the triangular pin boss 136 and smaller data sockets 146 that are disposed in the body of the triangular pin boss generally surrounded by the power sockets. The larger power sockets 144 can transfer high-voltage, high-current electrical power and/or function as an electrical ground while the smaller data sockets 146 can transmit lower powered data signals.

Figure 3:
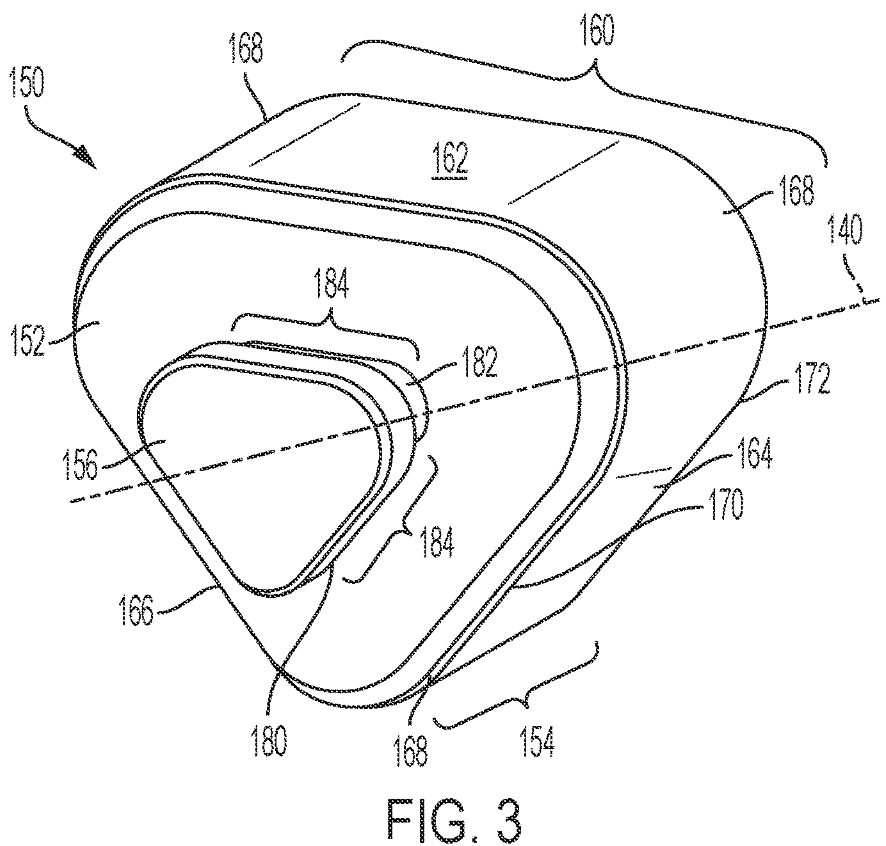
FIG. 3 is a front perspective view of an embodiment of a protective cap characterized by a thin-walled triangular shell that can be mated to the inlet receptacle when the receptacle is not connected with a charging plug of the electrical charging system.
Figure 4:
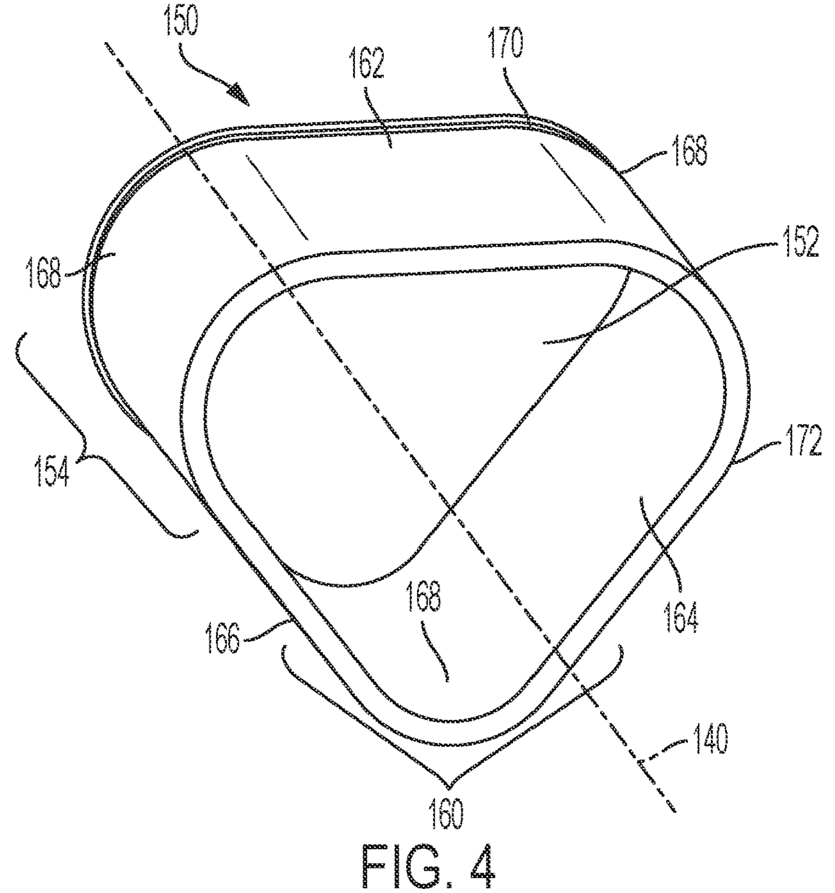
FIG. 4 is a rear perspective view of the protective cap showing a pin boss cavity spatially defined by the triangular shell.

To enclose and protect the inlet receptacle 122 from debris or moisture when not mated with the charging plug, and to prevent inadvertent human contact with the conductive materials inside, referring to FIGS. 3 and 4, a protective cap 150 can be provided. The protective cap 150 can be made as an integrally formed, single piece construction from non-conductive polymer such as a moldable thermoplastic. The protective cap 150 moreover can have a generally triangular shaped geometric configuration, e.g., an equilateral triangle, to connectively mate with and be detachably retained by the correspondingly shaped inlet receptacle. For references purposes, the insertion axis 140 can be described as generally aligned with and passing through the centroid defined by the triangular geometry of the protective cap 150.

For example, to mate with and enclose the inlet receptacle, the protective cap 150 can have a planar cap plate 152 that, for references purposes, is oriented normal to the insertion axis 140 when mating with the inlet receptacle. Integrally joined to and extending perpendicularly in a first direction from the cap plate 152 can be a triangular shell 154. For handling of the protective cap 150, a cap handle 156 that is dimensionally sized for grasping by a human operator or a mechanical device can extend from the cap plate 152 in a second direction opposite the first direction of the triangular shell 154.

To provide the geometric profile of the illustrated protective cap 150, the triangular shell 154 can include a three-sided peripheral wall 160 having first planer panel 162, a second planer panel 164, and a third planer panel 166. The three-sided peripheral wall 160 can be dimensionally coextensive with cap plate 152, which can have the same geometric outline of the triangular shell 154. The first, second, and third planer panels 162, 164, 166 can be roughly rectangular in shape and can be arranged as an equilateral triangle about the insertion axis 140. A corresponding number of rounded bevels 168 can be located at each vertex of the triangular shell 154 to interconnect the plurality of planer panel together at the minor edges. One of the major edges of each of the planar panels may form a proximal rim 170 of the peripheral wall 160 that is integrally adjoined to the cap plate 152 while the second of the major edges of the planer panels form a distal rim 172 axially spaced apart from the cap plate 150 with respect to the insertion axis 140.

The first, second, and third planer panels 162, 164, 166 can each be of a thin-walled structure such that the peripheral wall 160 encloses and defines an internal hollow space referred to as a pin boss cavity 174. The pin boss cavity 174 can correspond in geometric shape with the triangular shell 154. Access to the pin boss cavity 174 is provided at the distal rim 172, which remains opened, while the cap plate 152 is joined at the proximal rim 170 of the peripheral wall 160 that laterally encloses the pin boss cavity 174 at that location. In an embodiment, a resilient or pliable gasket 176 can be attached to the surface to the cap plate 152 exposed inwardly to the pin boss cavity 174. The pliable gasket 176 can be a mate of foam rubber or the like having a similar triangular shape as the cap plate 152 that is adhered thereto with an adhesive backing.

With reference to FIG. 1, when the protective cap 150 is aligned with the insertion axis 140 and mated to the inlet receptacle 122, the triangular pin boss 136 can be received into the correspondingly shaped pin boss cavity 174 defined by triangular shell 154. Moreover, the peripheral wall 160 of the triangular shell 154 that is made up of the thin-walled planar panels 162, 164, 166 can be nested or received in and form a sliding fit with the correspondingly shaped receptacle channel 138 disposed between the triangular boundary wall 130 and the triangular pin boss 136. The sliding fit of the receptacle channel 138 and the peripheral wall 160 enables the inlet receptacle 122 to retain the protective cap 150 until a sufficient removal force is applied to the cap handle 156. The gasket 176 can contact and resiliently press against the apertures of the plurality of pin sockets 142 of the inlet receptacle 122 to provide additional sealing against debris and moisture.

Figure 5:
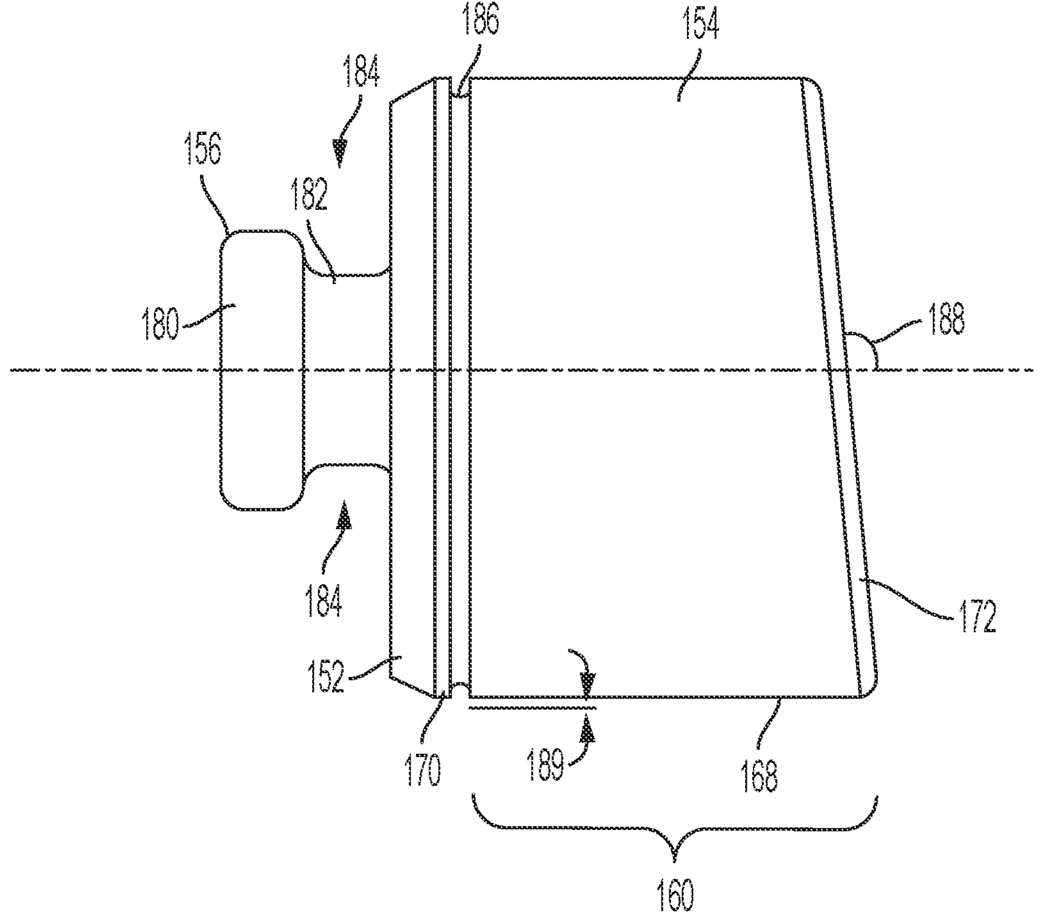
FIG. 5 is a side elevational view of the protective cap showing the cap handle ergonomically configured for grasping.

Referring to FIGS. 3 and 5, the cap handle 156 can be ergonomically configured for grasping and manipulation of the protective cap 150. For example, the cap handle 156 can include a flange 180 that is connected to and spaced apart from the cap plate 152 by a standoff web 182. The flange 180 can be generally flat or planar and can be oriented parallel to the cap plate 152. The standoff web 182 can extend perpendicularly between the flange 180 and cap plate 152 thereby spatially spacing the structures apart and providing the cap handle 156 with a sufficient length to be effectively grasped during use. The flange 180 can be dimensionally larger than the standoff web 182 so that it extends beyond and overhangs the offset web to define one or more recesses or undercuts 184 located between the spaced-apart flange 180 and the cap plate 150. The wider flange 180 and narrower standoff web 182 connected thereto provide the cap handle 156 with a knob-like characteristic with the undercuts 184 allowing fingers to be inserted behind the flange 180 when attempting to grasp and pull the cap handle 156.

The cap handle 156 can be centrally located with respect to the cap plate 152 from which the cap handle protrudes, though in possible embodiments, the cap handle may be offset with respect toward one of the edges of the proximal rim 170 of the cap plate 152. In an embodiment, the cap handle 156 including the flange 180 and standoff web 182 can be generally triangular in shape to correspond with the triangular profile of the protective cap 150, although in other embodiments the cap handle may have other geometric shapes or configurations. In the embodiments where the triangular shell 154 of the protective cap is an equilateral triangular with equal sides and vertices angles, the flange 180 of the cap handle 156 can also be an equilateral triangle.

The protective cap 150 can include other features to facilitate mating connection with the inlet receptacle of the electrical connector. For example, to seal the inlet receptacle from debris and moisture, and to help retain the protective cap 150 within the inlet receptacle when mated thereto, one or more O-ring grooves 186 can be disposed into the outer surface of the triangular shell 154. The location of the O-ring groove 186 may coincide with the proximal rim 170 and the O-ring groove may extend about and circumscribe the three planer panels 162, 164, and 166 of the peripheral wall 160. The O-ring groove 186 may have a three-sided geometric cross-section to receive an O-ring or another profiled seal made of a relatively elastomeric or resilient material such as a polymer. The dimensional depth of the O-ring groove 186 may be selected such that a portion of the O-ring will protrude beyond the exterior surface of the triangular shell 154. When the protective cap 150 is mated to the inlet receptacle 122 shown in FIG. 2, the O-ring may distort against and resilient exert a scaling pressure against the inner surface of the triangular boundary wall 130, which also helps frictionally maintain the protective cap 150 within the receptacle recess 134.

In another example, the protective cap 150 can include another sealing configuration such as a bulb seal or gasket made of resiliently compressible material such as foam rubber that linearly circumscribes the triangular shell 154 so as to seal against the boundary wall of the inlet receptacle. The bulb seal may include a rounded bulb that protrudes from the exterior surface of the peripheral wall 160 that can contact and compress against the boundary wall 130 of the inlet receptacle 122 when mated with the protective cap 150.

In another example, the protective cap 150 can include one or more protruding, thin and flexible seal fins that extend outwardly from and circumscribe the exterior surface of the triangular shell 154. The seal fins may be thin-walled, flexible structures that extend linearly around the peripheral wall 160, for example, proximate to the proximal rim 170, and may be perpendicular or angled with respect to the surface of the peripheral wall. In an embodiment, a plurality of flexible fin seals extend in parallel to each other from the peripheral wall. The seal fins may contact and flexibly brush against the interior surface of the boundary wall during insertion thereby sealing the inlet receptacle. In various embodiments, the seals and/or gaskets can be distinct separate structures attached to the protective cap 150 or can be integrally formed as part of the protective cap by a co-molding process to enable the relative difference in elastic resiliency between polymeric seal and the relatively rigid material of the rest of the protective gap.

Referring to FIG. 5, in an embodiment, to facilitate insertion of the protective cap 150 into the inlet receptacle, the distal rim 172 of the triangular shell 154 can be oriented at an inclined angle 188 with respect to the insertion axis 140. For example, the inclined angle 188 causes the distal rim 172 to be slanted with respect to the planar cap plate 152 so that the distal rim is not truly perpendicular to the insertion axis 140 and one of the three rounded bevels 168 is established as a leading edge of the triangular shell 154. During mating of the protective cap 150 with the inlet receptacle, the leading edge of the distal rim 172 is received first into the spatially larger receptacle recess. During further insertion of the two structures, the subsequent sliding contact between the distal rim 172 and the boundary wall will bring the triangular outline of peripheral wall 160 into alignment with the triangular geometric configuration of the inlet receptacle. Because the inclined angle 188 of the distal rim 172, the protective cap 150 can tolerate a certain amount of misalignment with the inlet receptacle during insertion.

In an embodiment, to further facilitate insertion of the protective cap 150, the triangular shell 154 may be slightly tapered inwardly with respect to the insertion axis 140. For example, the first, second, and third planar panel 162, 164, and 166 of the peripheral wall 160 may be joined a tapered axis 189 that deviates from a perpendicular or right angle with respect to the flat cap plate 152. The tapered axis 189 can be formed by slanting the first, second, and third planar panel 162, 164, and 166 with respect to the cap plate 152 or by progressively reducing the thickness of the peripheral wall 160 between the proximal rim 170 joined to the cap plate 152 and distal rim 172 spaced therefrom.

INDUSTRIAL APPLICABILITY

Figure 6:
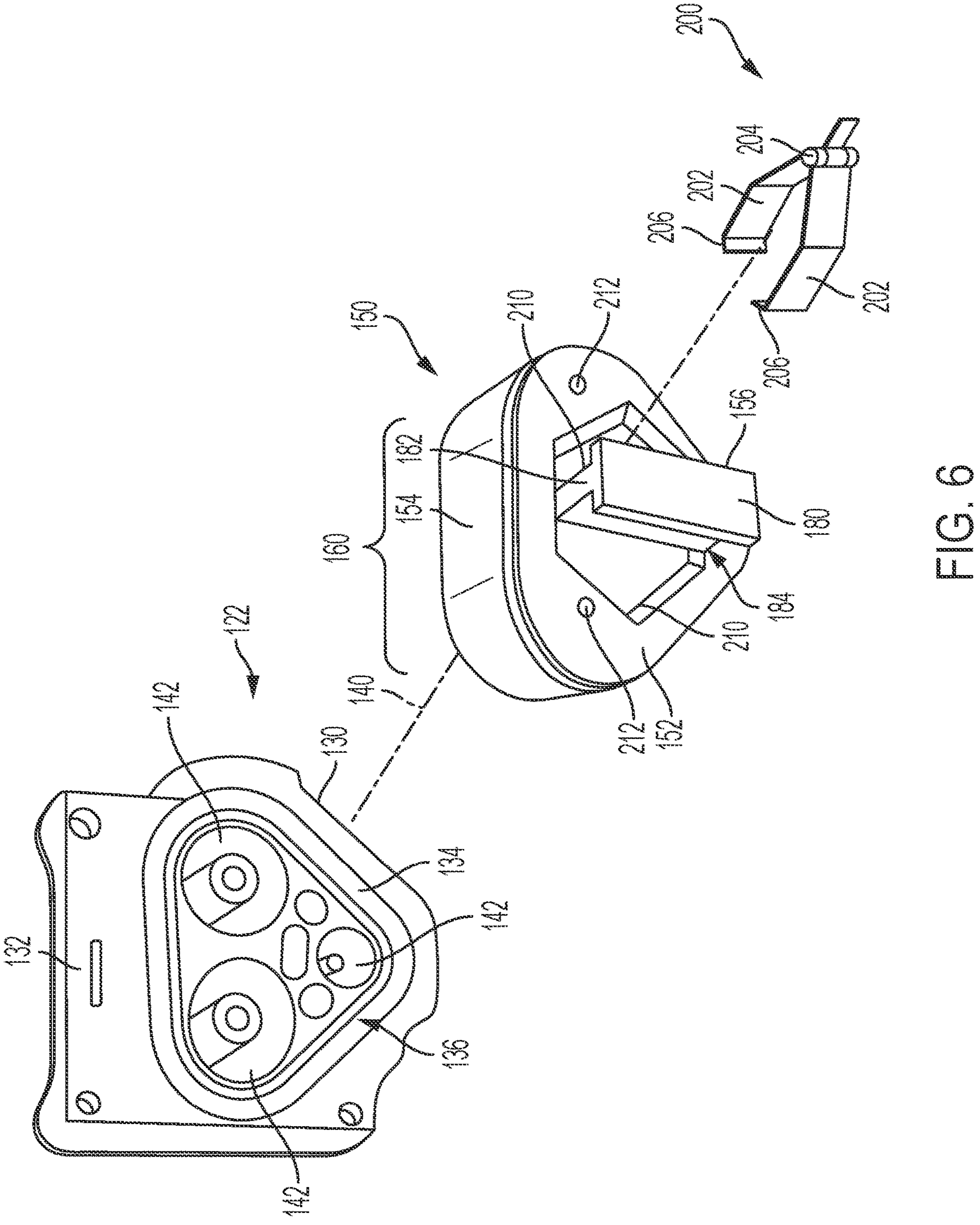
FIG. 6 is a perspective assembly view of an embodiment of the protective cap being operatively mated to the inlet receptacle by mechanical gripper.

Referring to FIG. 6, in an aspect, the protective cap 150 in an embodiment can be configured for cooperative operation with a mechanical gripper 200. The mechanical gripper 200 can be structured as a mechanical linkage having a plurality of extended gripper fingers 202 or jaws that can move with respect to each other by way of a hydraulic, pneumatic, or electrical drive. In the illustrated embodiment, the mechanical gripper 200 can be configured as a two-fingered angular gripper in which the two gripper fingers 202 are interconnected at a common hinged joint 204 that acts as a fulcrum. The gripper fingers 202 can pivotally articulate with respect to each other to enclose and grasp and/or open and release an object between their respective distal fingertips 206. In another example, the mechanical gripper 200 may be of a parallel design in which the coextensive gripper fingers 206 are movable together and apart in parallel with each other. To move and spatially align the mechanical gripper 200 with the inlet receptacle 122 and the protective cap 150, the mechanical gripper can operate as the end effector attached at the distal end of a robotic arm.

In the example wherein the mechanical gripper 200 is designed as a two-fingered configuration, the cap handle 156 of the protective cap 150 can have a corresponding geometric arrangement to facilitate operative interaction with the two gripper fingers 202. In the illustrated embodiment of the cap handle, the flange 180 and the offset web 182 may be generally rectangular in shape and oriented so that the flange and offset web extend generally between the first planar panel 162 and the opposite rounded bevel 168 of the peripheral wall 160. The rectangular flange 180 can be wider than the respectively narrower offset web 182 so that the recesses or undercuts 184 are again formed between the end cap 152 and the parallel, overhanging edges of the flange 180.

In operation, the mechanical gripper 200 is moved into alignment with the cap handle 156 of the protective cap 150. The mechanical gripper 200 can be moved adjacent to the cap handle 156 so that the distal fingertips 206 extend past the flange 180 and can be moved into the undercuts 184 between the flange and cap plate 152 to make physical contact with the cap handle 156. The mechanical gripper 200 may be referred to as forming an encompassing grip with respect to the cap handle 156 wherein the flange 180 is encompassed and grasped by the gripper fingers 202. The distal fingertips 206 can be formed with barbs or hooks to facilitate an encompassing grip. The mechanical gripper 200 can thereafter move the protective gap with respect to the insertion axis 140 to mate or detach the protective cap 150 and the inlet receptacle 122.

Designing the protective cap 150 for operative interaction with a mechanical gripper 200 advantageously enables automation of the electrical charging system 100 during the recharging process. For example, referring back to FIG. 1, the inlet receptacle 122 may be disposed at a location on the machine frame 106 that is not readily accessible by an operator. For example, in the case where the mobile mining haul machine 102 is a large sized haul truck with the onboard operator station accessible via a ladder and catwalk arrangement 114, it may be inconvenient for an operator to dismount the machine to recharge the electric batteries 118. Likewise, if the mobile mining haul machine 102 is an autonomous machine, there may not be an operator present to conduct the recharging process using the electrical recharging system 100.

Accordingly, aspects of the protective cap 150 may be designed to facilitate operative interaction with a robotically operated mechanical gripper 200. For example, the rigidity of the polymeric material of the protective cap 150 provides sufficient strength for the exertion and transmission of force from the mechanical gripper 200 during mating and detachment. The relative rigidity of the polymer material may also help resist deformation or displacement of the protective cap 150 during insertion into the receptacle channel 138 that could result in misalignment or improper mating and allowing the protective cap 150 to come loose and detach from the inlet receptacle 122.

In another example, the cap handle 156 can have an irregular shape or can be associated with additional features to facilitate alignment of the protective cap 150 with the inlet receptacle along the insertion axis 140. For example, the cap handle 156 can be adjacent to one or more geometric notches 210 disposed into the planar surface of the cap plate 152 and that are shaped for an exclusive geometric fit with the distal fingertips 206 that enable a fixed or predetermined spatial alignment between the protective cap 150 and the mechanical gripper 200. Kinematics can thereafter be used to determine and adjust the relative spatial locations of the mechanical gripper 200 with respect to the inlet receptacle 122 and/or the insertion axis 140 to ensure the correct mating orientation of the protective cap 150. In the embodiment of FIG. 3, wherein the cap handle 156 has a triangular shape, the protective cap 150 may be operatively grasped by a mechanical gripper 200 having three gripper finger 202 and the irregular triangular shape provides for the exclusive geometric fit between the structures.

In another example, the flange 180 of the cap handle 156 may be disposed flush with the plane of the cap plate 152 rather than protrude beyond the cap plate. In such an embodiment, the geometric notches 210 may still be disposed into the planar surface of the cap plate 152 to serve as the undercuts that allow the gripper fingers 202 to extend around and grasp the otherwise flush flange 180. Locating the flange 180 flush with the planar cap plate 152 eliminates any structural protrusion from the protective cap 150 that could otherwise inadvertently contact or strike a passing object.

In another example, the protective cap 150 can include visibly perceptible locating features 212 disposed on the cap plate 152. The locating features 212 can be, for example, color contrasting dots or circles and can be arranged in a unique pattern or arrangement. The robot that may be operatively associated with the mechanical gripper 200 can have machine vision capabilities to detect the pattern of the locating features 212 to assist in alignment of the mechanical gripper 200 and the protective cap 150. Other features that can be included with the protective cap 150 to facilitate alignment and mating can include textured surfaces, dowel pins, etc.

In an embodiment, the protective cap 150 can be a distinct component and fully separable from the inlet receptacle 122. The protective cap 150 can therefore be retained by the mechanical gripper 200 during the recharging process and will not be displaced with respect to the automated electrical charging system 100. In other embodiments wherein the electrical charging system 100 is not automated, the protective cap 150 can be attached or tethered with respect to the inlet receptacle 122 by, for example, a keychain or the like.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms “a” and “an” and “the” and “at least one” or the term “one or more,” and similar referents in the context of describing the invention (especially in the context of the following claims) are to be construed to cover both the singular and the plural, unless otherwise indicated herein or clearly contradicted by context. The use of the term “at least one” followed by a list of one or more items (for example, “at least one of A and B" or one or more of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A protective cap configured for detachably mating to inlet receptacle of an electrical charging system comprising:

a triangular shell including a peripheral wall having a first planar panel, a second planar panel, and a third planar panel integrally connected together, the peripheral wall enclosing a pin boss cavity;

a cap plate integrally joined to the triangular shell at a proximal rim, the cap plate oriented normal to the first planar panel, the second planar panel, and the third planar panel; and a cap handle integrally joined to and protruding from the cap plate opposite the triangular shell, wherein the peripheral wall defines a distal rim axially spaced apart from the cap plate, wherein the distal rim is aligned at an inclined angle with respect to an insertion axis of the protective cap to define a leading edge of the distal rim, and wherein the cap plate and the triangular shell are configured to enclose pin sockets of the inlet receptacle within the pin boss cavity when the protective cap is mated to the inlet receptacle.

2. The protective cap of claim 1, wherein the cap handle includes a flange connected to the cap plate by a standoff web to define an undercut between the flange and the cap plate.

3. The protective cap of claim 2, wherein the flange corresponds in triangular shape to the triangular shell.

4. The protective cap of claim 2, wherein the flange is rectangular in shape.

5. The protective cap of claim 1, wherein a plurality of rounded bevels join the first planar panel, the second planar panel, and the third planar panel.

6. The protective cap of claim 1, wherein the peripheral wall tapers between the proximal rim to the distal rim inwardly with respect to the pin boss cavity.

7. The protective cap of claim 1, wherein the protective cap is made of a rigid plastic material.

8. The protective cap of claim 7, further comprising a resilient sealing member disposed on an exterior of the peripheral wall circumscribing the triangular shell.

9. The protective cap of claim 8, wherein the resilient sealing member is at least one of an O-Ring, a bulb seal, and a fin seal.

10. The protective cap of claim 1, wherein the cap plate is coextensive with the peripheral wall of the triangular shell.

11. The protective cap of claim 1, wherein the triangular shell is an equilateral triangle.

12. An electrical connector defined along an insertion axis for an electrical charging system comprising:

an inlet receptacle including a triangular pin boss disposed within a receptacle recess and including a plurality of pin sockets, the triangular pin boss circumscribed by a triangular boundary wall separated therefrom by a receptacle channel, the triangular pin boss defining a centroid generally aligned with an insertion axis of the inlet receptacle; and a protective cap detachably mateable to the inlet receptacle, the protective cap including:

a cap plate oriented normal to the insertion axis when mated;

a triangular shell including a peripheral wall integrally joined to and extending from the cap plate in a first direction, the peripheral wall having a first planar panel, a second planar panel, and a third planar panel triangularly arranged with respect to each other and configured for a sliding fit with the receptacle channel, the peripheral wall enclosing a pin boss cavity; and a cap handle integrally joined to and protruding from the cap plate in a second direction opposite the first direction, wherein the peripheral wall defines a distal rim axially spaced apart from the cap plate, wherein the distal rim is aligned at an inclined angle with respect to an insertion axis of the protective cap to define a leading edge of the distal rim, and wherein the cap plate and the triangular shell are configured to enclose the plurality of pin sockets of the inlet receptacle within the pin boss cavity when the protective cap is mated to the inlet receptacle.

13. The electrical connector of claim 12, wherein the cap handle includes a flange connected to the cap plate by a standoff web to define an undercut between the flange and the cap plate.

14. The electrical connector of claim 13, wherein the cap handle is configured to be clamped by a mechanical gripper.

15. The electrical connector of claim 14, wherein the cap plate includes a notch disposed therein, the notch being shaped for a geometric fit with the mechanical gripper.

16. The electrical connector of claim 14, wherein the protective cap includes one or more visibly perceptible locating features disposed on the cap plate configured to enable the mechanical gripper to align with respect to the insertion axis.

17. The electrical connector of claim 12, wherein the protective cap is made of a rigid polymer.

18. The electrical connector of claim 17, wherein the protective cap further includes a resilient sealing member disposed on an exterior of the peripheral wall circumscribing the triangular shell.

19. The electrical connector of claim 18, wherein the resilient sealing member is at least one of an O-Ring, a bulb seal, and a fin seal.

* * * * *